(12) United States Patent
Gibson et al.

(10) Patent No.: US 9,170,436 B2
(45) Date of Patent: Oct. 27, 2015

(54) LUMINESCENT STACKED WAVEGUIDE DISPLAY

(75) Inventors: Gary Gibson, Palo Alto, CA (US); Richard H. Henze, San Carlos, CA (US); Patricia A. Beck, Palo Alto, CA (US); Xia Sheng, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/346,817

(22) PCT Filed: Oct. 31, 2011

(86) PCT No.: PCT/US2011/058677
§ 371 (c)(1),
(2), (4) Date: Mar. 24, 2014

(87) PCT Pub. No.: WO2013/066306
PCT Pub. Date: May 10, 2013

(65) Prior Publication Data
US 2014/0233879 A1    Aug. 21, 2014

(51) Int. Cl.
*G02F 1/295* (2006.01)
*G02F 1/01* (2006.01)
*G02F 1/1335* (2006.01)
*F21V 8/00* (2006.01)
*G02F 1/167* (2006.01)

(52) U.S. Cl.
CPC .............. *G02F 1/011* (2013.01); *G02B 6/0003* (2013.01); *G02B 6/0076* (2013.01); *G02F 1/1336* (2013.01); *G02F 1/167* (2013.01); *G02F 2001/133618* (2013.01)

(58) Field of Classification Search
CPC ..... G02B 6/0003; G02B 6/0076; G02F 1/011
See application file for complete search history.

(56) References Cited

U.S. PATENT DOCUMENTS

| | | | |
|---|---|---|---|
| 6,210,012 B1 | 4/2001 | Broer | |
| 6,680,726 B2 | 1/2004 | Gordon, II et al. | |
| 6,842,170 B1 * | 1/2005 | Akins et al. | 345/173 |
| 7,511,771 B2 | 3/2009 | Stern et al. | |
| 7,714,504 B2 | 5/2010 | Forrest et al. | |
| 7,902,560 B2 | 3/2011 | Bierhuizen et al. | |
| 7,929,816 B2 * | 4/2011 | Meir et al. | 385/39 |
| 2008/0285125 A1 | 11/2008 | Lee et al. | |
| 2010/0060822 A1 | 3/2010 | Sun | |

FOREIGN PATENT DOCUMENTS

KR   10-2000-0000807 A   1/2000

OTHER PUBLICATIONS

English translation (machine-generated) of Abstract from Korean Patent Publication No. 10-2000-0000807A [retrieved on Mar. 13, 2013], Retrieved from the Internet: <http://worldwide.espacenet.com/publicationDetails/biblio?DB=worldwide.espacenet.com&II=1     &ND=3&adjacent=true&locale=en_EP&FT=D& date=20000115&CC=KR&NR=20000000807A&KC=A>.

International Search Report and Written Opinion, Jul. 30, 2012, PCT Patent Application No. PCT/US2011/058677.

Kiston, et al., Bright Color Reflective Displays with Interlayer Reflectors, Optics Express, vol. 19, Issue 16, Jul. 2011, pp. 15404-15414.

International Preliminary Report on Patentability, May 15, 2014, The International Bureau of WIPO, PCT Patent Application No. PCT/US2011/058677.

* cited by examiner

*Primary Examiner* — Omar R Rojas
(74) *Attorney, Agent, or Firm* — Hewlett-Packard Patent Department

(57) ABSTRACT

A display includes at least two stacked waveguides (110) and (120). A first waveguide (110) contains first luminophores that fluoresce to produce light of a first color. A second waveguide (120) overlying the first waveguide and contains second luminophores that fluoresce to produce light of a second color. A light collection structure (180) transmits light from a surrounding environment transversely through the first and second waveguides (110, 120) and optical vias (172, 174) provide optical paths out of the display for light respectively from the first optical waveguide (110) and the second optical waveguide (120).

16 Claims, 5 Drawing Sheets

LUMINESCENT STACKED WAVEGUIDE
DISPLAY

CROSS-REFERENCE TO RELATED
APPLICATION

This application is a U.S. National Stage Application of and claims priority to International Paten Application No. PCT/US2011/058677, filed on Oct. 31, 2011, and entitled "LUMINESCENT STACKED WAVEGUIDE DISPLAY".

BACKGROUND

Current reflective display technologies struggle to provide adequate brightness over a reasonable color gamut. The performance of most color reflective displays is limited, in part, because each pixel or sub-pixel in a conventional reflective display returns light only in an intended optical band while wasting incident light in other portions of the visible spectrum. For example, a red sub-pixel may include a filter that allows reflection of incident red light but absorbs incident green and blue light. Similarly, green and blue sub-pixels may respectively include filters that only permit reflection of green or blue light and absorb other wavelengths of incident light. As a result, the intensity of the reflected light in a color display is generally reduced to only a fraction of the intensity of the incident light, e.g., less than a third of the intensity of the incident light.

BRIEF DESCRIPTION OF THE DRAWINGS

Use of the same reference symbols in different figures may indicate similar or identical items.

DETAILED DESCRIPTION

A reflective display can employ multiple waveguides that are doped with or otherwise contain different fluorescent materials or luminophores that produce display light, and the waveguides can be stacked to efficiently collect a large fraction of incident electromagnetic energy. In particular, each waveguide can absorb incident photons and fluoresce to produce light of a color that is characteristic of fluorescent material or luminophores in that waveguide. Each waveguide also collects and guides fluorescent light emitted within the waveguide to optical vias that are associated with the color of light produced and guided. The optical vias can then direct the respective colors of light from the waveguides to a display surface. Optical shutters or other systems associated with the optical vias and waveguides can control the intensities of the different colors of light emitted through an array of the optical vias to thereby control the color of pixels and/or produce an image being displayed.

A reflective display using stacked luminescent waveguides can efficiently use incident illumination by an ordered stacking of waveguides so that waveguides containing fluorescent materials that produce longer wavelength light are closest to the display surface and overlie waveguides containing fluorescent materials that produce shorter-wavelength light. As a result, light that escapes from, or is not collected by, a waveguide further from the display surface may be captured and cause fluorescence in overlying waveguides.

Figure 1A:
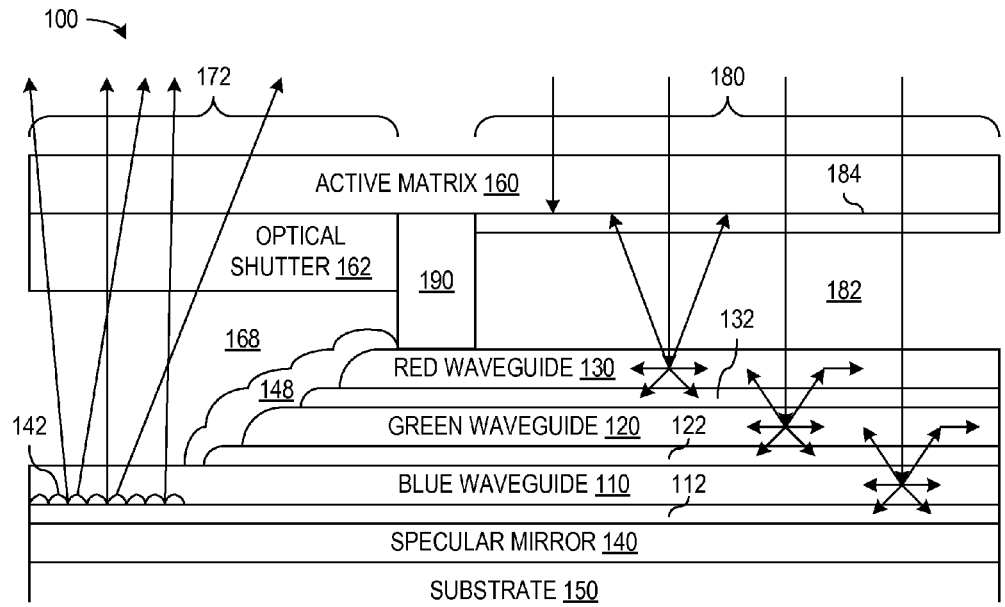
FIGS. 1A, 1B, and 1C respectively show cross-sectional views of blue, green, and red light optical vias in an example of a reflective display containing stacked photoluminescent waveguides.

FIG. 1A shows a portion of a display 100 including three luminescent waveguides 110, 120, and 130 that respectively produce blue, green and red light. In an exemplary configuration, waveguides 110, 120, and 130 can include luminescent layers of a base material such as a transparent polymer, for example polymethylmethacrylate (PMMA), containing luminophores such as organic dyes, semiconducting nanoparticles, inorganic phosphors, polymers, and oligomers. The luminescent layers can be formed as part of a stack in which waveguide 120 overlies waveguide 110 and waveguide 130 overlies waveguide 120. The luminescent layer or layers for each of waveguides 110, 120, or 130 may, for example, be about 10 to 50 μm thick. Each of waveguides 110, 120, and 130 has different absorption and emission spectra that result from use of different luminophores. For example, waveguide 110 may contain a polymer layer with an organic dye component. Some examples organic dye component include but are not limited to certain perylenes, coumarins, rhodamines, sulforhodamines, cynines, pyrenes, pyrimidines, bodipys, and floresceins that fluoresce to produce light in a wavelength range corresponding to the color blue. Waveguide layer 120 may similarly include a polymer layer with an organic dye component that fluoresces to produce light in a wavelength range corresponding to the color green, and waveguide layer 130 may a polymer layer with an organic dye component that fluoresces to produce light in a wavelength range corresponding to the color red. Waveguides 110, 120, and 130 may also contain other material, such as stabilizer or antioxidant. As described further below, the thicknesses of the luminescent layers and the concentrations of the respective luminophores in those layers may be selected so that waveguides 110, 120, and 130 provide desired levels of absorption and energy conversion to produce appropriate levels of brightness of the respective colors produced in waveguides 110, 120, and 130.

In addition to a layer containing luminophores, each of waveguides 110, 120, and 130 may further include transparent layers (not shown) that have a refractive index close to, or higher than, that of the luminescent layers. Having transparent layers with high refractive index on one or both sides of a luminescent layer may increase the overall thickness of waveguides 110, 120, and 130, but the transparent layers can reduce self-absorption within waveguides 110, 120, and 130 and improve the ability of waveguides 110, 120, and 130 to guide display light. In particular, the guided light will be at least partly in the transparent layer or layers and therefore less likely to interact with the fluorescent material. As described further below, interactions of guided light with fluorescent material can cause transmission of light out of waveguide 110, 120, or 130.

Display 100 includes a light collection region 180 that corresponds to a transparent portion of an active matrix 160.

Light collection region 180 overlies waveguides 130, 120, and 110 and generally transmits photons that can cause fluorescence in waveguides 110, 120, and 130. In particular, incident light from the surrounding environment can enter display 100 in light collection region 180 and sequentially pass through waveguides 130, 120, and 110 in a direction that is approximately transverse to the direction of guided light in waveguides 130, 120, and 110. Each of waveguides 130, 120, and 110 absorbs some of the incident light and produces an associated color of display light. Each waveguide 130, 120, or 110 can each preferentially absorb different wavelength regions of the incident light spectrum, so that waveguides 130, 120, and 110 collectively convert all or a large portion of the incident light into display light.

Waveguide layer 110 in the illustrated configuration of FIG. 1 overlies a specular reflector or mirror 140 that is formed on a supporting substrate 150. Mirror 140 may include a reflective layer of a metal such as silver or may be formed using multiple layers of dielectric material. Substrate 150 can be any type of rigid or flexible support material such as glass, a polymer, or a semiconductor. Cladding layers 112 and 122 of a material having a low refractive index, e.g., a low refractive index polymer, inorganic compound such as $MgF_2$, or a nanoporous material such as a silica aerogel, separate waveguide 110 from mirror 140 and waveguide 120, respectively. Another cladding layer 132 of low refractive index material separates waveguide 120 from waveguide 130. An air gap 182 is above waveguide 130 in FIG. 1, but optionally, a further low refractive index cladding layer (not shown) could be provided on a top surface of waveguide 130. The cladding layers including at least layers 112, 122, and 132 and the interface between waveguide 130 and air gap 182 allow waveguides 110, 120, and 130 to trap luminescent light by total internal reflection.

Some or all of cladding layers 112, 122, and 132 could be replaced in an alternative configuration of display 100 with wavelength-selective mirrors. For example, a mirror that reflects the green luminescent light could be used in place of cladding layer 122 below green waveguide 120. Bragg stacks or reactive mesogen cholesteric films could be used to create the wavelength-selective mirrors. However, cladding layers 112, 122, and 132 have advantages including ease of manufacture, lower cost, and thinness.

Active matrix 160, which can be an electronic circuit such as commonly employed in displays, controls optical shutters including an optical shutter 162 that is adjacent to an optical via 172. Active matrix 160 over optical via 172 and over virtual all of the display surface may be transparent or close to transparent with the possible exception of areas of active matrix 160 such as those above standoff 190. However, in principle, active matrix 160 over a given optical via such as optical via 172 only needs to be transparent to the wavelengths emitted by that optical via.

Optical via 172 corresponds to an opening through waveguides 130 and 120 that exposes a region of waveguide 110 or cladding layer 122. Optical via 172 provides a path for light that is extracted from of waveguide 110 by a scattering element 142. Scattering element 142 can be formed in or adjacent to the portion of waveguide 110 running under optical via 172. Although FIG. 1A shows an example where scattering element 142 is near a bottom surface of waveguide 110, scattering element 142 could alternatively be formed near the top surface of waveguide 110. Scattering element 142, which interacts with guided modes of waveguide layer 110 to diffusely scatter light out of waveguide 110 into optical via 172, may be a diffuse mirror, e.g., a region of a reflective material such as silver with a rough or textured surface, or a diffractive element that diffracts light in a range of directions.

Optical via 172 provides an optical path from waveguide 110 to optical shutter 162, which is near the display surface of display 100. The inner surface of optical via 172 may be reflective and particularly contains a reflective cap 148 that prevents light from escaping from exposed ends of waveguides 120 and 130. Reflective cap 148 may be a region of reflective material such as a silver region having a rough or textured surface toward the interior of optical via 172. The rough or textured surface may prevent specular reflection of any light entering optical via 172 from the display surface.

Figure 2A:
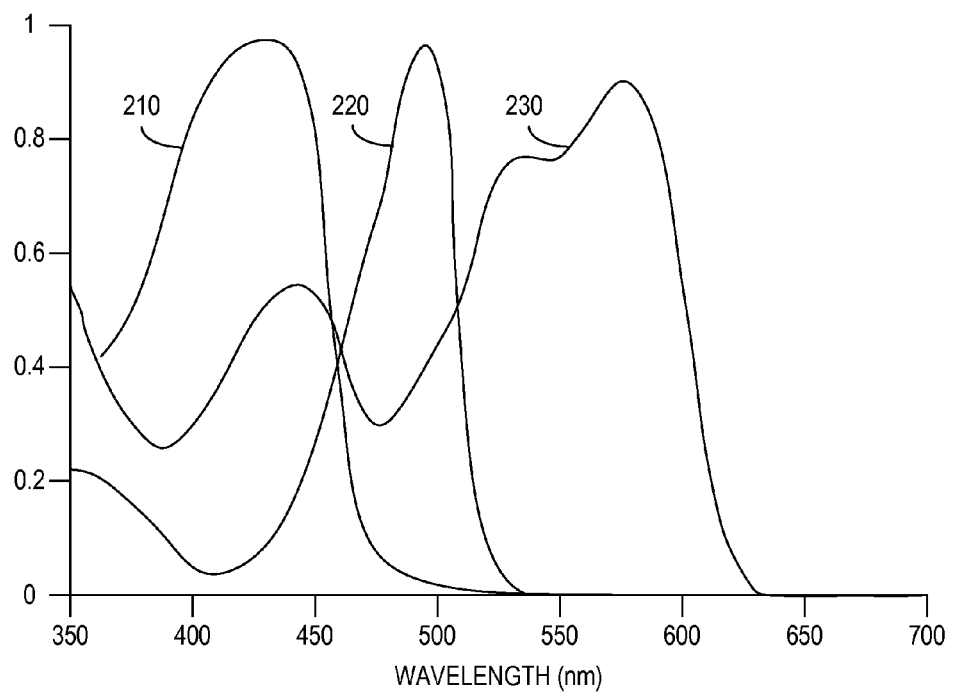
FIG. 2A illustrates examples of the absorption spectra for three different fluorescent materials.

Operation of optical via 172 is illustrated by light rays in FIG. 1A. In particular, light collection region 180 admits light from the surrounding ambient environment, e.g., indoor lighting or sunlight, that is initially incident on and passes into waveguide 130. As noted above, waveguide 130 contains a fluorescent material that absorbs a fraction of the incident photons having wavelengths that are sufficiently short and emits photons having wavelengths that are longer than the wavelengths of the absorbed photons. As an example, FIG. 2A shows an absorption spectrum 230 for a fluorescent material that has an emission spectrum 235 shown in FIG. 2B. The spectra shown in FIGS. 2A and 2B correspond to an implementation of waveguide 130 including an organic dye in a transparent polymer matrix. In this case, absorption spectrum 230 shows that waveguide 230 predominantly absorbs wavelengths between about 520 and 600 nm. The fluorescent material in waveguide 130 emits light having spectrum 235, which is primarily at wavelengths corresponding to red light, e.g., between about 570 and 700 nm in the illustrated example. The fluorescent light may be emitted isotropically in random directions in waveguide 130. Most of the emitted light can be trapped in guided modes of waveguide 130, due to total internal reflection at the interfaces of waveguide 130 with cladding layer 132 and air gap 182. In particular, assuming isotropic emission of light by the luminophores in waveguide 130, about 72% of the light emitted in waveguide 130 will be trapped in waveguide modes of waveguide 130 if the refractive indices of waveguide 130 and cladding layer 132 are about 1.6 and 1.2, respectively.

Some of the red light emitted in waveguide 130 is not confined within waveguide 130 and can escape directly to air gap 182. Other red light that is not collected in waveguide 130 may pass down through waveguides 120 and 110, reflect from mirror 140, and pass upward through waveguides 110, 120, and 130 into air gap 182. The red light that escapes through the top or bottom surface of waveguide 130 may thus escape into air gap 182. A filter 184 can be provided in light collection region 180 to absorb red light and thereby reduce the intensity of light that might otherwise emerge from light collection region 184. As a result, filter layer 184 may also block some of the light incident on optical input port 184. To minimize the loss of useful illumination, filter layer 184 may be a short pass or band pass filter that only blocks the emitted red wavelengths and/or long wavelength red light that is not efficiently absorbed in waveguides 110, 120, and 130.

Figure 2B:
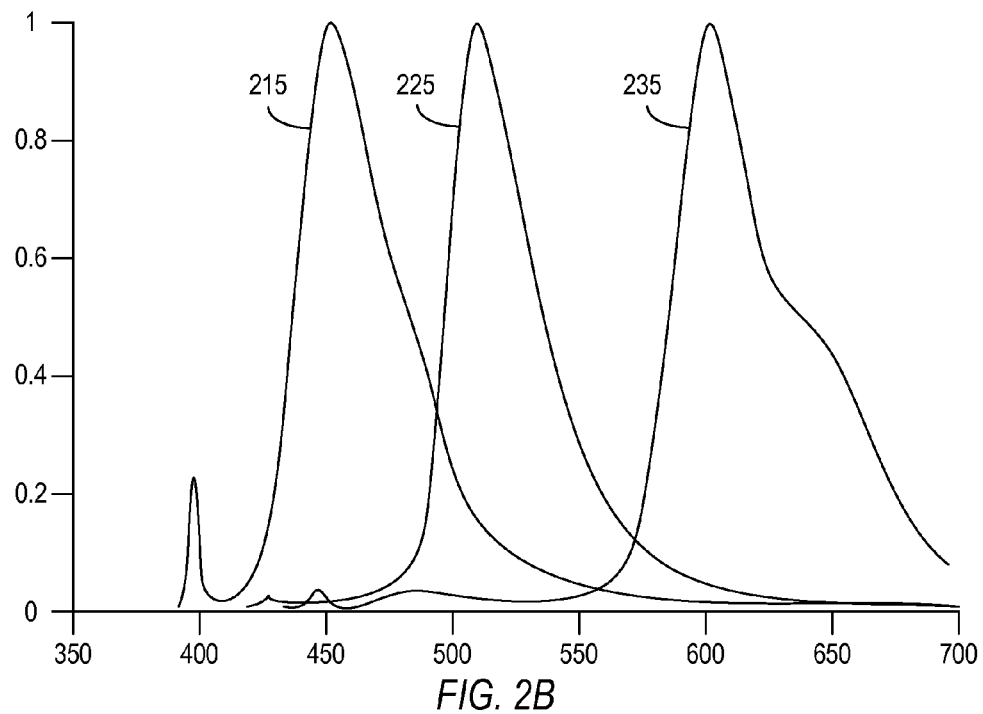
FIG. 2B illustrates examples of the emission spectra of the fluorescent materials having absorption spectra shown in FIG. 2A.

Waveguide 120 may contain luminophores with an absorption spectrum similar to spectrum 220 of FIG. 2A and an emission spectrum similar to emission spectrum 225 of FIG. 2B. With this configuration, incident light with wavelengths between about 460 and 520 nm are primarily absorbed by waveguide 120, causing the fluorescent material in waveguide 120 to produce green light. If the refractive index of waveguide 120 is 1.6 and the refractive index of cladding layers 122 and 132 is 1.2, then about 67% of the green light emitted in waveguide 120 will be trapped in waveguide modes (assuming isotropic emission from the luminophores).

The remaining about 33% of the green light, escapes from waveguide 120 but has a wavelength that is efficiently absorbed by fluorescent material in waveguide 130. Thus, a majority of the optical energy escaping from waveguide 120 can be converted into useful red light for reflective display 100.

Waveguide 110 may contain luminophores that have an absorption spectrum similar to spectrum 210 of FIG. 2A and an emission spectrum similar to emission spectrum 215 of FIG. 2B. With this configuration, wavelengths below about 460 nm (including ultraviolet light) are primarily absorbed by waveguide 110 and converted to blue light. If the refractive index of waveguide 110 is 1.6 and the refractive index of cladding layers 112 and 122 is 1.2, then about 67% of the blue light emitted will be trapped in guided modes of waveguide 110 (again assuming isotropic emissions from the luminophores). Blue light that escapes capture in waveguide layer 110 has a wavelength that may be efficiently absorbed by waveguide layer 120 or 130, so that again the majority of optical energy lost from waveguide 110 may converted to useful green or red light in waveguide 120 or 130.

The above description illustrates an example using organic dyes as luminophores in waveguides 110, 120, and 130. Some further examples of fluorescent materials that could be used in waveguides 110, 120, and 130 include luminescent polymers, oligomers, or monomers, inorganic phosphors, or semiconducting nanoparticles. Combinations of different fluorescent materials can also be used in a waveguide 110, 120, or 130 to engineer a luminescent layer with desired absorption and emission spectra. A luminescent film can further be designed to employ energy transfer processes such as Förster exchange to relay the absorbed energy to a lower energy emissive species, which re-emits the absorbed electromagnetic energy in a desired wavelength band. In one configuration, waveguides 110, 120, and 130 will absorb nearly 100% of light in respective wavelength ranges, and the absorption ranges collectively absorb most of the visible spectrum and possibly cover at least some ultraviolet light wavelengths.

Waveguides 110, 120, and 130 are generally interactive in that the amount of electromagnetic energy coupled into each waveguide 110, 120, and 130 and available as useful display light depends not only on the directly incident light but also on the ability of overlying waveguides to capture energy lost by underlying waveguides. In particular, as described above, some of the light emitted in a waveguide 110, 120, or 130 will not be captured into a guided mode of that waveguide 110, 120, or 130. Also, while light in guided modes can travel hundreds of micrometers within waveguides 110, 120 and 130, some of the light initially captured in a waveguide 110, 120, or 130 may be lost from waveguide 110, 120, or 130 due to re-absorption and re-emission because some of the re-emitted light may be within the escape cone. Blue and green light that escapes a waveguide 110 or 120 may be efficiently recaptured (and converted) by an overlying waveguide 120 or 130, which effectively increases the fractions of incident light captured in waveguides 120 and 130. The relative thicknesses and optical densities of the luminescent layers in waveguides 110, 120, and 130 can be adjusted to compensate for this redistribution of incident energy. In particular, by properly choosing the optical densities of each luminescent layer, i.e., the layer thicknesses and concentrations of luminophores, along with the optical spectra of the luminophores and the relative indices of refraction of layers in the stacked structure, the partitioning of the incident light energy into the different color waveguides can be controlled to achieve a desired color balance.

Figure 1B:
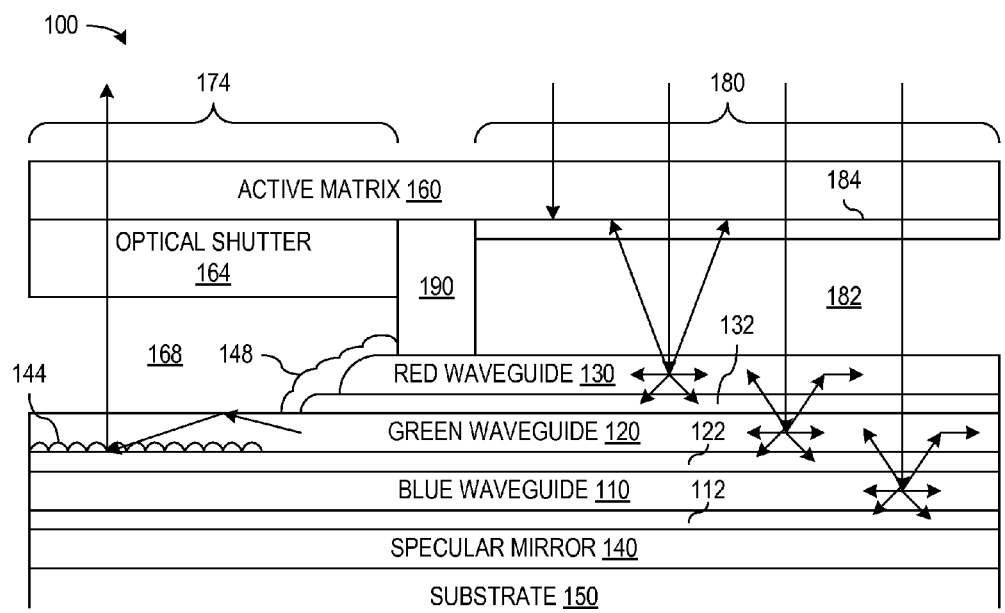
Figure 1C:
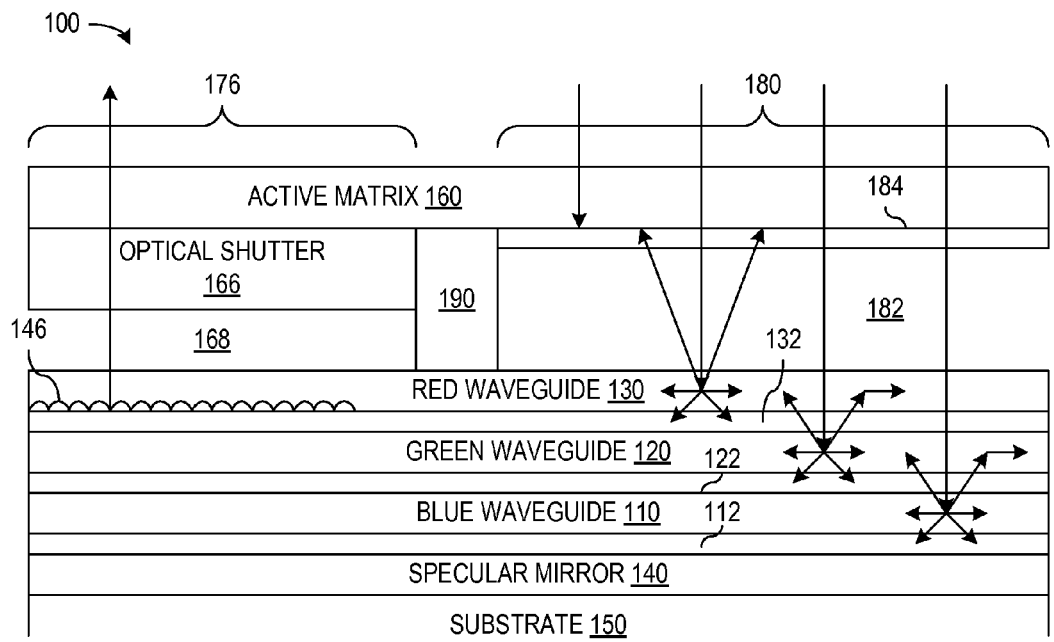

Optical via 172 in FIG. 1A returns blue light to the display or viewing surface as described above and is sometimes referred to herein as a blue optical via. FIGS. 1B and 1C respectively show a green optical via 174 and a red optical via 176. Green optical via 174 of FIG. 1B is similar to blue optical via 172 of FIG. 1A but is shallower in that green optical vial corresponds to a region of display 100 in which waveguide 130 is missing or removed, and a reflective cap 148 in green optical via 174 prevents red light from escaping into green optical via 174 from an end of waveguide 130. Waveguide 110 may be continuous under green optical via 174 and guide light collected in light collection region 180 to a blue optical via elsewhere in display 100. A scattering element 144 is positioned in or adjacent to waveguide 120 and scatters green light out of waveguide 120 into green optical via 174, so that an optical shutter 164 under the control of active matrix 160 can modulate the intensity of green light that is emitted to the display surface from optical via 174.

Red optical via 176 of FIG. 1C is similar to blue and green optical vias 172 and 174 of FIGS. 1A and 1B but does not require an opening passing through any waveguide since red light can be extracted from the top surface of waveguide 130 in the configuration of FIG. 1C. Waveguides 110, 120, and 130 may thus be continuous under red optical via 176. A scattering element 146 is positioned in or adjacent to waveguide 130 and scatters red light out of waveguide 130 into red optical via 176, so that an optical shutter 166 under the control of active matrix 160 can modulate the intensity of red light that is emitted to the display surface from optical via 176.

Figure 3A:
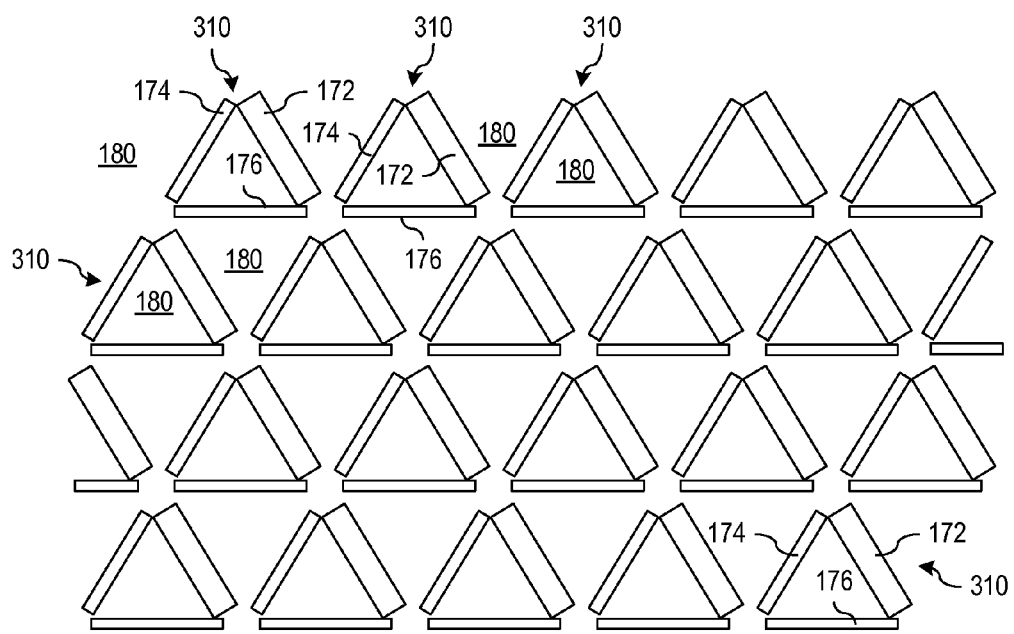
FIGS. 3A and 3B show plan views for two examples of arrangements of optical vias on a color reflective display.

Blue, green, and red optical vias 172, 174, and 176 can be used in combination to create a color pixel of display 100, and such color pixels can be arranged in a pixel array of a color reflective display. FIG. 3A shows a plan view of one possible arrangement of optical vias 172, 174, and 176 to form color pixels 310 in an array. In the plan view of FIG. 3A, blue, green, and red optical vias 172, 174, and 176 are laid out on a hexagonal grid with surrounding and intervening areas being use for light collection region 180. Each portion of light collection region 180 could direct light to any of any neighboring or remote pixel 310 and therefore is not specifically assigned to any particular pixel 310. In general, light collection region 180 can occupy all available display area not being used by vias 172, 174, and 176. Accordingly, the sizes of vias 172, 174, and 176 may be minimized in order to maximize the amount of light collected. However, blue optical vias 172 may need to be wider and longer than green or red optical vias 174 or 176 to accommodate the greater depth of blue optical vias 172 in the illustrated configuration of FIG. 1A. In particular, if scattering element 142 of FIG. 1A provides the same angular spread of display light as produced by scattering elements 144 and 146 of FIGS. 1B and 1C, blue optical vias 172 may need to be wider and somewhat longer to prevent the interior walls of blue optical vias 172 from limiting the divergence of display light emerging from blue optical vias 172. Differences in the angular spread of display light can affect the range of viewing angles of display 100. For similar reasons, green optical vias 174 may need to be wider and longer than red optical vias 176.

Figure 3B:
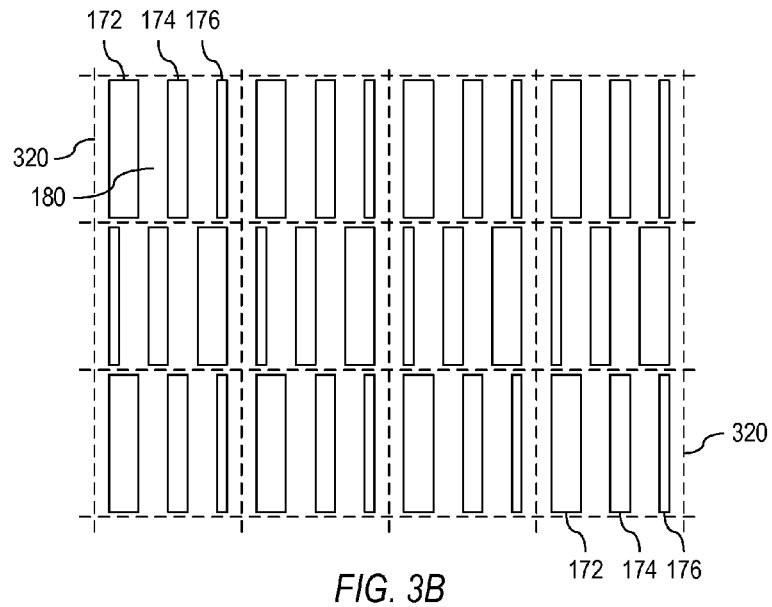

FIG. 3B shows a plan view for another example of an arrangement of optical vias 172, 174, and 176 and light collection region 180 to form pixels 320 of a color reflective display. In FIG. 3B, optical vias 172, 174, and 176 are rectangular, and pixels 320 are on a rectangular grid. More generally, the arrangement of optical vias 172, 174, and 176 may be varied widely in different displays. For example, FIGS. 3A and 3B both show arrangements in which each pixel 310 or 320 contains three rectangular vias 172, 174, and 176. However, a single color pixel can include multiple blue, green, or red optical vias 172, 174, or 176, and the optical vias can be of any desired shape, e.g., circular or triangular. The shapes, spacing, and sizes of optical vias 172, 174, and 176 in a display could be chosen to maximize the fraction of light delivered to and output from optical vias 172, 174, and 176. However, optical vias 172, 174, and 176 generally need to be small enough that a viewer does not perceive individual vias 172, 174, or 176, and small vias 172, 174, and 176 provide more area for light collection region 180. FIGS. 3A and 3B are provided here to illustrate two relatively simple examples of possible arrangements of optical vias in a display.

Optical vias 172, 174, and 176 can reflect incident ambient light having colors other than the respective emission colors. Such reflections may reduce the color saturation or contrast that an optical via provides. However, keeping the areas of vias 172, 174, and 176 as small as possible can minimize these unwanted reflections. Also, scattering element 142, 144, or 146 or the portion of mirror 140 at the bottom of each optical via 172, 174, or 176 could be made wavelength-selective, so that only the ambient wavelengths corresponding to the color of a given optical via 172, 174, or 176 are reflected by that optical via. Further, the scattering element 142, 144, or 146 at the bottom of an optical via 172, 174, or 176 may direct some of the ambient light incident on the optical via 172, 174, or 176 into the associated waveguide 110, 120, or 130, where the light can be converted into useful display light.

Display 100 in the example of FIGS. 1A, 1B, and 1C illustrates a display structure suitable for a two part assembly. In particular, waveguides 110, 120, and 130 can be fabricated on substrate 150 to create a first part of display 100. In one example of a fabrication process, specular mirror 140 can be fabricated on substrate 150 by a technique such as sputtering or electroplating of a reflective metal such as silver or aluminum, and then a stack including layers 112, 110, 122, 120, 132 and 130 can be fabricated by repeat application or printing of solutions or materials that are cured to form polymer films of the appropriate compositions. Openings for optical vias 172, 174, and 176 can either be etched or formed by control of the extent of the solutions that are cured, after which, reflective regions such as stops 148 can be formed in the openings.

Active matrix 160 and the optical shutters 162, 164, and 166 can be separately fabricated to form a second part of display 100. In particular, active matrix 160 and shutters 162, 164, and 166 can be fabricated using current display fabrication techniques to create a mostly transparent active matrix that electrically controls electro-optic shutters 162, 164, and 166. Shutters 162, 164, and 166 can be, for example, dichroic dye-LC guest-host systems or electrophoretic, electro-wetting, or electro-fluidic cells. The shutters 162, 164, and 166 on the transparent active matrix substrate 160 can then be aligned with optical vias 172, 174, and 176 formed on substrate 150, before active matrix 160 and shutters 162, 164, and 166 are attached to the structure including substrate 150. Standoffs 190 can be fabricated on substrate 150 or active matrix 160 to maintain desired air gaps 168 and 182 in optical vias 172, 174, and 176 and under light collection region 180.

Figure 4:
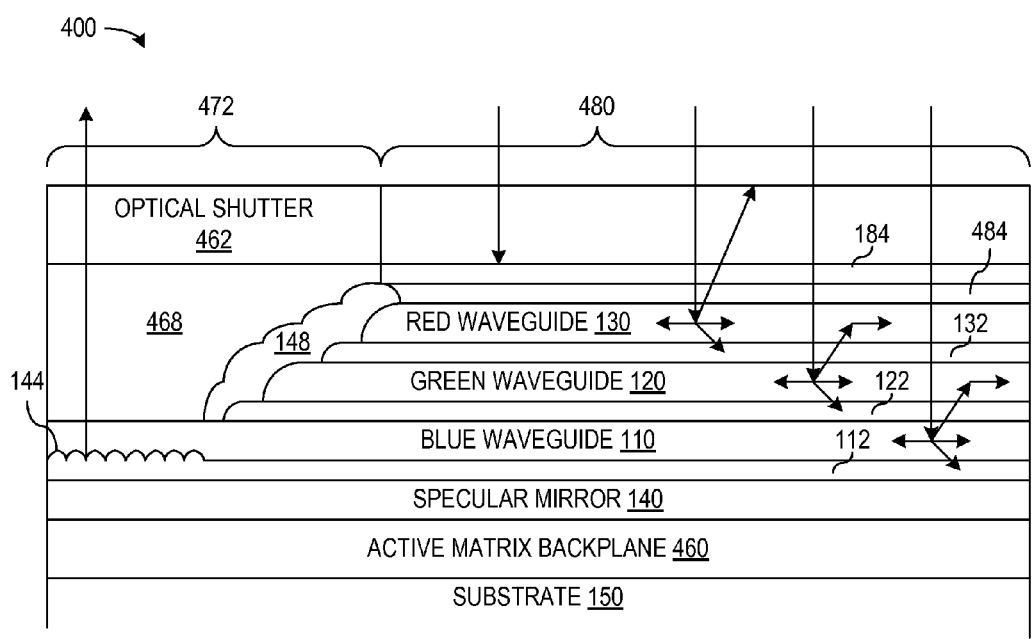
FIG. 4 shows a cross-sectional view of an optical via in an example of a reflective display including stacked waveguides overlying an active matrix backplane.

FIG. 4 shows a schematic cross-sectional representation of a portion of an alternative reflective display 400. Display 400 includes an active matrix 460 that is below luminescent waveguides 110, 120, and 130, and optical shutters 462 that are in a layer overlying waveguides 110, 120, and 130. Display 400 including active matrix 460 and optical shutters 462 can be fabricated on substrate 150 layer by layer with the stack structure including waveguides 110, 120, and 130, rather than fabricating an active matrix on a separate substrate. The structure of display 400 is otherwise similar to display 100 described above, except that air gaps 182 and 168 in light collection region 180 and optical via 172 of display 100 may be replaced with one or more regions 484 and 468 of a material have a low refractive index in a light collection region 480 and optical via 472. Electrical vias (not shown) connecting active matrix 460 to shutter 462 can potentially be combined with optical via 472 or could be separate from optical via 472. FIG. 4 only illustrates a blue optical via 472, but green optical vias and red optical vias in display 400 could be similar, differing primarily in that green optical vias and red optical vias would expose and extract light from areas of waveguide 120 and 130, instead of waveguide 110.

It may be noted that light sources can easily be incorporated into displays similar to the displays described above. For example, in display 100 of FIGS. 1A, 1B, and 1C, mirror 140 could be replaced by a near-UV, blue, or broadband backlight that directs light transversely through waveguides 110, 120, and 130. Waveguides 110, 120, and 130 would then redistribute the light from the backlight into the appropriate color bands. Alternatively, light sources at the periphery of display 100 could illuminate waveguides 110, 120, and 130 through a transparent waveguide layer with scattering elements (not shown) that direct light from the transparent waveguide layer transversely through luminescent waveguides 110, 120, and 130. In either case, a display could provide transflective operation in dark ambient lighting conditions.

Figure 5:
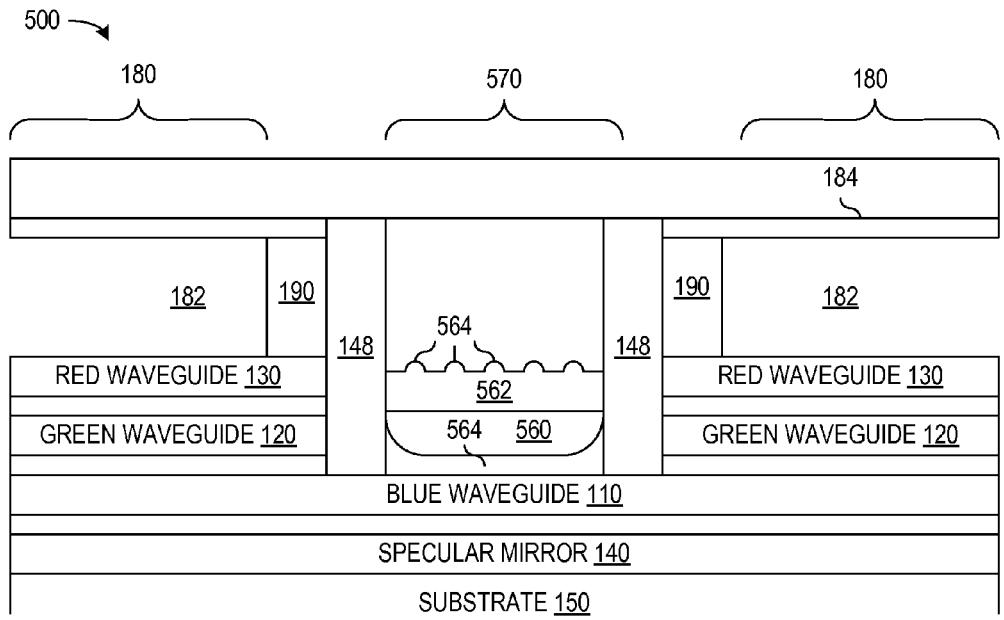
FIG. 5 shows an example of a display that uses electro-fluidic motion to control the amount of light extracted from a luminescent waveguide.

Displays having stacked luminescent waveguides can also use alternative modulation techniques from those described above. For example, optical shutters 162, 164, and 166 of FIGS. 1A, 1B, and 1C can be replaced with a system that changes the fraction of light that is extracted from respective waveguide 110, 120, and 130. In this regard, FIG. 5 shows a portion of a display 500 including an optical via 570 that contains a cavity 560 above a portion of waveguide 110 from which light is extracted. A top layer 562 of cavity 560 has a top surface that includes optical out-coupling structures 564 such as a hexagonal array of hemispherical lenslets or an array of scattering structures. A fluid 564 in cavity 560 can reversibly create an optical path from waveguide 110 to layer 562 through electro-wetting or some other controlled electrofluidic motion. Fluid 564 may have a refractive index that matches that of waveguide 110 and layer 562. As a result, an optical path that fluid 564 can create allows a leakage path for light to escape from luminescent waveguide 110 via optical out-coupling structures 564, and the amount of leakage can be used to control the brightness of optical via 570.

Figure 6:
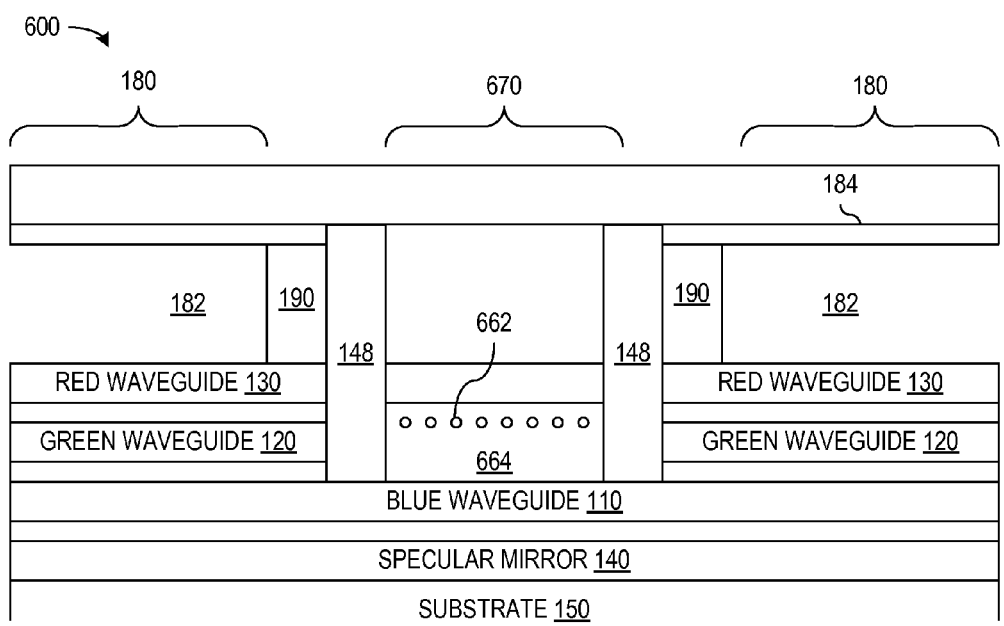
FIG. 6 shows an example of a display that uses electro-phoretic particles to control the amount of light extracted from a photoluminescent waveguide.

Another technique for controlling the brightness of an optical via is to modulate the optical scattering into the optical vias. For example, FIG. 6 shows a portion of a display 600 using electrophoretically-controlled optically scattering particles 662. Particles 662 may be suspended in a fluid 664 having a refractive index matching the refractive index of waveguide 110, and fluid 664 can either form a portion of waveguide 110 or be adjacent to waveguide 110. Particles 662 can be moved closer to or further from waveguide 110 to modulate the amount of light scattered out of waveguide 110, thereby increasing the emitted intensity of an optical via 670. This allows control over the amount light escaping from waveguide 110 into optical via 670 and obviates the need for an optical shutter adjacent to optical via 670.

Some configurations of the display systems and methods disclosed herein can provide significant advantages over other display systems. In particular, one advantage over some previous displays is that a display containing stacked luminescent waveguides can utilize a majority of the ambient light of all colors incident on most of the area of the display. Another advantage is that shutters may be limited to areas over the optical vias and not present in the light collection region. This may significantly enhance the achievable brightness because light only needs to pass through a shutter once. In some other systems, input and output light must traverse shutters that absorb some of the input light as well as the output light. Displays that guide light to optical vias may restrict the amount of light that escapes in areas away from the optical vias because almost all of the ambient light is either converted into light trapped in the waveguides or absorbed by the red-absorbing layer.

Although particular implementations have been disclosed, these implementations are only examples and should not be taken as limitations. The above examples of display system can be widely varied as will be understood from this disclosure. For example, the above description focuses on displays having three luminescent layers respectively producing red, green and blue display light, but primary colors other than red, green, and blue could be produced, and different display configurations could employ more or fewer than three primary colors and waveguide layers. Various other adaptations and combinations of features of the implementations disclosed are within the scope of the following claims.

What is claimed is:

1. A display comprising:
a first waveguide containing first luminophores that fluoresce to produce light of a first color;
a second waveguide overlying the first waveguide and containing second luminophores that fluoresce to produce light of a second color;
a light collection structure positioned to transmit light from a surrounding environment transversely through the first waveguide and the second waveguide;
a first optical via providing an optical path to a display surface for light from the first optical waveguide; and
a second optical via providing an optical path to the display surface for light from the second optical waveguide,
wherein the first optical via extends through an opening in the second waveguide.

2. The display of claim 1, further comprising:
a third waveguide overlying the second waveguide and containing third luminophores that fluoresce to produce light of a third color, wherein the light collection structure transmits the light from the surrounding environment transversely through the third waveguide; and
a third optical via providing an optical path to the display surface for light from the third optical waveguide.

3. The display of claim 2, wherein:
the first color corresponds to light with a first wavelength;
the second color corresponds to light with a second wavelength that is longer than the first wavelength; and
the third color corresponds to light with a third wavelength that is longer than the second wavelength.

4. The display of claim 1, wherein the first luminophores have an absorption spectrum that differs from an absorption spectrum of the second luminophores.

5. The display of claim 1, further comprising a filter that is in the optical collection structure and above the first waveguide and the second waveguide, wherein the filter absorbs red light.

6. The display of claim 1, further comprising a first scattering element positioned to scatter light from the first waveguide into the first optical via.

7. The display of claim 6, further comprising an optical shutter positioned to control light output from the first optical via.

8. The display of claim 1, further comprising a system that controls brightness of the first optical via by controlling an amount of light escaping from the first waveguide into the first optical via.

9. The display of claim 1, further comprising a mirror underlying the first waveguide.

10. The display of claim 1, further comprising:
a substrate on which the first waveguide and the second waveguide are formed; and
an active matrix that is attached to the substrate and operates to control brightness of the first optical via and the second optical via.

11. The display of claim 1, further comprising:
a first optical shutter over the first optical via;
a second optical shutter over the second optical via;
an active matrix over the first wave guide and the second waveguide and connected to control the first optical shutter and the second optical shutter, the active matrix being transparent in at least areas corresponding to the light collection structure, the first optical via, and the second optical via.

12. A display comprising:
a first waveguide containing first luminophores that fluoresce to produce light of a first color;
a second waveguide overlying the first waveguide and containing second luminophores that fluoresce to produce light of a second color;
a light collection structure positioned to transmit light from a surrounding environment transversely through the first waveguide and the second waveguide;
a first optical via providing an optical path to a display surface for light from the first optical waveguide;
a second optical via providing an optical path to the display surface for light from the second optical waveguide;
a first optical shutter over the first optical via;
a second optical shutter optical over the second optical via; and
an active matrix over the first wave guide and the second waveguide and connected to control the first optical shutter and the second optical shutter, the active matrix being transparent in at least areas corresponding to the light collection structure, the first optical via, and the second optical via.

13. The display of claim 12, further comprising:
a third waveguide overlying the second waveguide and containing third luminophores that fluoresce to produce light of a third color, wherein the light collection structure transmits the light from the surrounding environment transversely through the third waveguide; and
a third optical via providing an optical path to the display surface for light from the third optical waveguide.

14. The display of claim 13, wherein:
the first color corresponds to light with a first wavelength;
the second color corresponds to light with a second wavelength that is longer than the first wavelength; and
the third color corresponds to light with a third wavelength that is longer than the second wavelength.

15. The display of claim 12, wherein the first optical via extends through an opening in the second waveguide.

16. The display of claim 12, wherein the first luminophores have an absorption spectrum that differs from an absorption spectrum of the second luminophores.

* * * * *